United States Patent
Adler

(10) Patent No.: US 6,196,257 B1
(45) Date of Patent: Mar. 6, 2001

(54) METHOD AND DEVICE FOR DIRECTING WATER-FLOW TO HORIZONTAL FLOOR-DRAIN

(76) Inventor: Yehezkel Adler, 2828 W. Coyle, Chicago, IL (US) 60645

(*) Notice: Subject to any disclaimer, the term of this patent is extended or adjusted under 35 U.S.C. 154(b) by 0 days.

(21) Appl. No.: 09/536,847

(22) Filed: Mar. 28, 2000

(51) Int. Cl.[7] .................................................. F16L 5/00
(52) U.S. Cl. ......................... 137/362; 137/56 A; 137/15
(58) Field of Search .............................. 137/362, 56 A, 137/15

(56) References Cited

U.S. PATENT DOCUMENTS

| | | | |
|---|---|---|---|
| 3,742,525 | * | 7/1973 | Oropallo ................................. 4/288 |
| 3,744,065 | * | 7/1973 | Yavitch ................................... 4/613 |
| 3,939,863 | * | 2/1976 | Robison ............................... 137/357 |
| 3,990,469 | * | 11/1976 | Ralston ............................... 137/362 |
| 4,123,810 | * | 11/1978 | Oropallo ................................. 4/288 |
| 4,871,451 | * | 10/1989 | Piskula ................................ 210/164 |
| 4,922,948 | * | 5/1990 | Dijk ................................. 137/247.33 |
| 4,978,250 | * | 12/1990 | Dallmer ............................... 405/303 |
| 5,022,430 | * | 6/1991 | Degooyer ............................ 137/362 |
| 5,124,031 | * | 6/1992 | Dallmer ............................... 210/164 |
| 5,267,522 | * | 12/1993 | Skaarup et al. ..................... 114/74 R |
| 5,645,103 | * | 7/1997 | Whittaker ............................ 137/312 |
| 5,878,448 | * | 3/1999 | Molter ................................... 4/613 |

* cited by examiner

Primary Examiner—A. Michael Chambers
Assistant Examiner—Thomas L. McShane
(74) Attorney, Agent, or Firm—Milton S. Gerstein

(57) ABSTRACT

A method and device that aid persons in directing the dirty water being pushed along the horizontal floor-surface toward and into the drain-hole of the floor. The device is provided with a main housing-insert which is capable of being inserted into the opening of a conventional drain-hole of a floor. The housing-insert is preferably frustoconical is shape, in order to be received in different and variously sized drain-holes. Attached to the housing-insert is a pair of elongated, water-deflecting leg-members. Each leg-member is attached or supported at one end thereof to an upper portion of the housing-insert. The other ends of the legs extend outwardly in cantilever fashion. The two leg-members form an angle therebetween from their extension from the housing-insert, with the drain-hole contained within the space between the leg-members. In the preferred embodiment of the invention, the leg-members are pivotally connected at their one ends to the housing-insert. In another embodiment, the ends of the leg-members need not be connected to the housing-insert, but need only be supported thereon. In yet another embodiment, no insert-member is used.

22 Claims, 4 Drawing Sheets

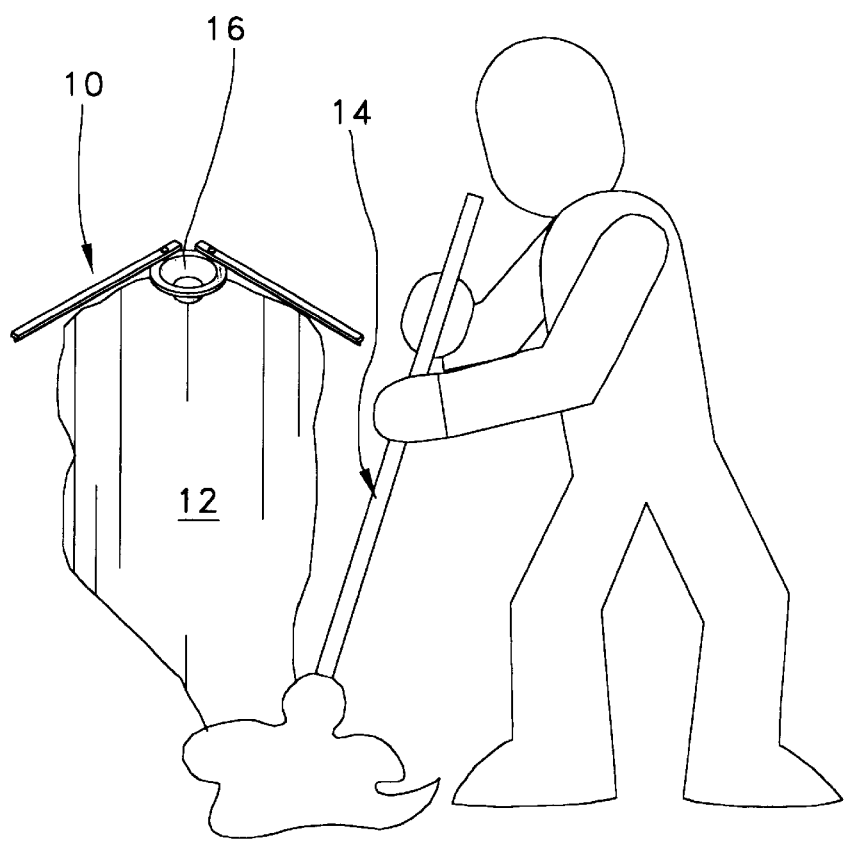
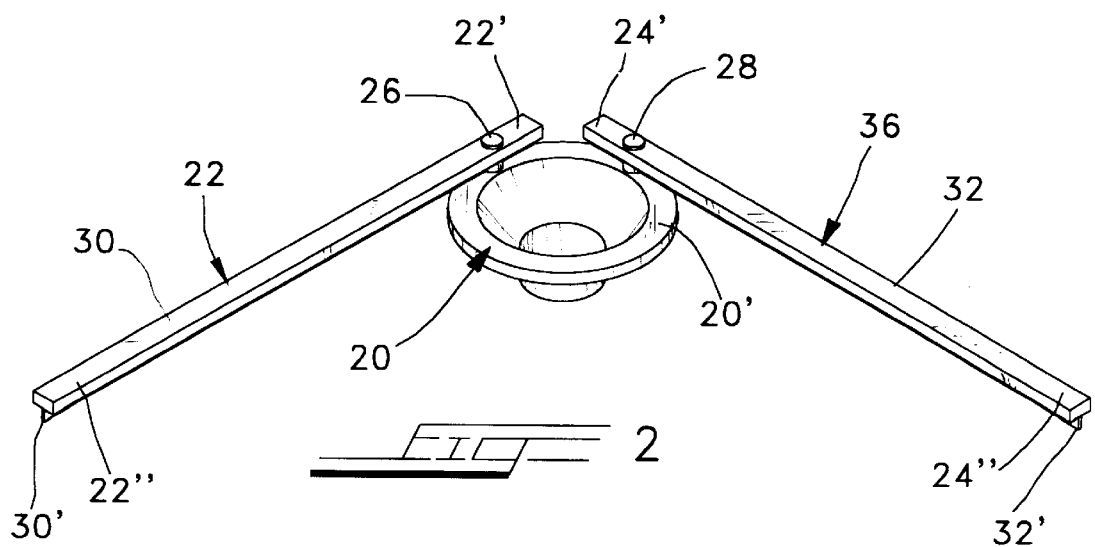

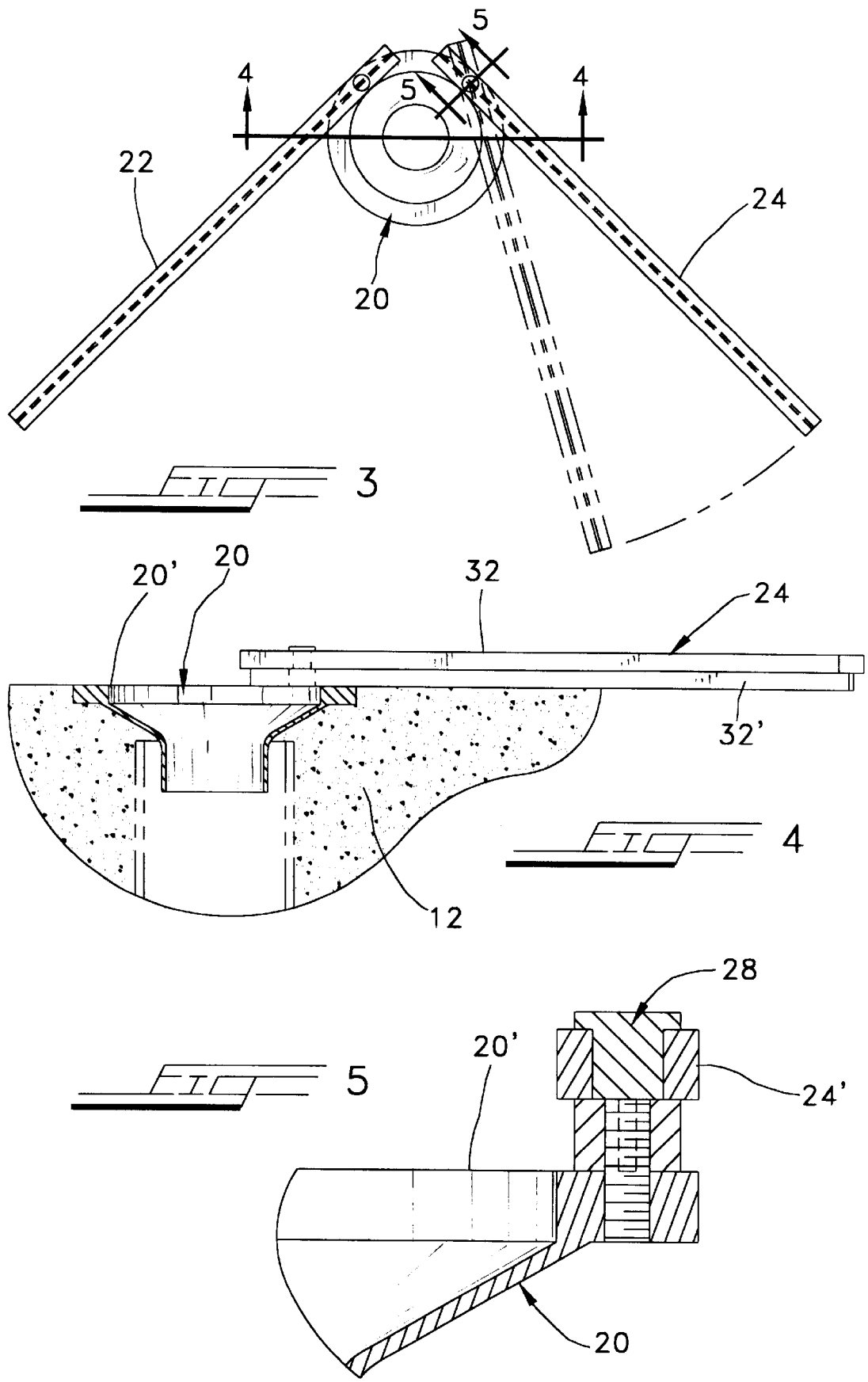

US 6,196,257 B1

METHOD AND DEVICE FOR DIRECTING WATER-FLOW TO HORIZONTAL FLOOR-DRAIN

BACKGROUND OF THE INVENTION

In some countries of the world, floor-drains are provided in the floor of residences, hotels, and the like, by which the floor may be washed clean using water, and pushing the water along the floor surface while directing it to a generally centrally-located drain-hole by which the dirty water may be drained away. Typically, one pours the water, either with or without a cleaning agent, onto the floor, and then pushes the poured water along the floor toward the drain-hole using a conventional floor squeegee, sponge mop, or cotton-strand mop, and the like. However, since the drain-hole provided in the floor is usually provided at the bottom of a generally diminutively-sized depression, pushing the dirty water toward and into the drain-hole is a relatively tedious and time-consuming task, since as one pushes the dirty water thereat, the water will overshoot or miss the generally diminutively-sized depression containing the drain-hole. Thus, multiple attempts at pushing the water into the drain-hole is necessary.

SUMMARY OF THE INVENTION

It is, therefore, the primary objective of the present invention to provide a method and device that will aid persons in directing the dirty water being pushed along the horizontal floor-surface toward and into the drain-hole of the floor.

It is another objective of the present invention to provide a method and device that will aid persons in directing dirty water being pushed along the horizontal floor-surface toward and into the drain-hole of the floor, which device is portable and removable, and which is easily insertable into a conventional drain-hole of a floor.

It is yet another objective of the present invention to provide a method and device that will aid persons in directing dirty water being pushed along the horizontal floor-surface toward and into the drain-hole of the floor, which device is portable and removable, and which is easily insertable into a conventional drain-hole of a floor, and which is adjustable in order to accommodate various-sized and dimensioned pushing tools for pushing the dirty water toward and into the drain-hole.

Toward these and other ends, the device of the present invention is provided with a main housing-insert which is capable of being inserted into the opening of a conventional drain-hole of a floor. The housing-insert is preferably frustoconical is shape, in order to be received in different and variously sized drain-holes. Attached to the housing-insert is a pair of elongated, water-deflecting leg-members. Each leg-member is attached at one end thereof to an upper portion of the housing-insert. The other ends of the legs extend outwardly in cantilever fashion. The two leg-members form an angle therebetween from their extension from the housing-insert, with the drain-hole contained within the space between the leg-members. Each leg-member is provided, preferably, with a downwardly-projecting, elongated rubber or squeegee-like deflecting member extending, preferably, at least most of the length of the respective leg, which deflecting member contacts the floor-surface to prevent the flowing water from flowing therepast. In the preferred embodiment of the invention, the leg-members are pivotally connected at their one ends to the housing-insert. In another embodiment, the ends of the leg-members need not be connected to the housing-insert, but need only be supported thereon.

BRIEF DESCRIPTION OF THE DRAWINGS

The invention will be more readily understood with reference to be accompanying drawings, wherein:

FIG. 1 is an isometric view showing the device of the invention in use;

FIG. 2 is an isometric view showing the device of the invention with its drain-hole housing-insert to which are secured two deflecting leg-members for deflecting dirty water toward and into floor drain-hole;

FIG. 3 is a top view thereof;

FIG. 4 is a cross-sectional view taken along line 4—4 of FIG. 3; and

FIG. 5 is a cross-sectional view taken along line 3—3 of FIG. 3;

DETAILED DESCRIPTION OF THE INVENTION

Figure 6:
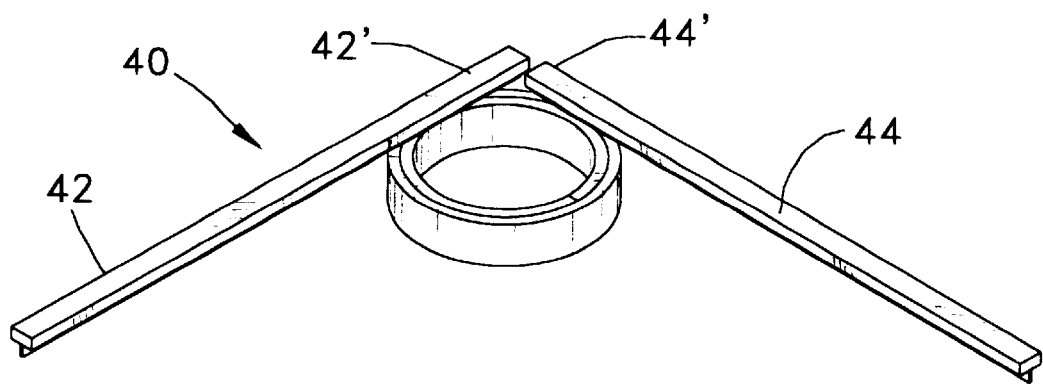
FIG. 6 is an isometric view of a second embodiment of the invention.

Referring out to the drawings in greater detail, there is shown in FIG. 1 the general use of the device 10 of the invention. Water or other cleaning liquid 12 is poured onto a floor-surface to be cleaned and pushed therealong by means of a squeegee, sponge-head, mop, and the like, 14, and directing that water toward a drain hole 16. The device 10 of the invention deflects and directs the water being pushed directly into the drain-hole 16, and discussed hereinbelow.

The device 10 of the invention, in the preferred embodiment, consists of a main housing-insert member 20, as best seen in FIGS. 2 and 4. The member 20 is preferably frustoconical in shape, so that variously sized and shaped drain-holes 16 may receive the member 20. However, it is to be understood that the member 20 need not be frustoconical in shape, but may ring-shaped, cylindrical, and the like. The member 20, also, preferably has an upper perimetric rim 20' to which is supported a pair of elongated, liquid-deflecting leg-members 22, 24. Each leg-member has a first end 22', 24', respectively, and a second, cantilevered end 22", 24", respectively. The first ends 22', 24', are supported by the rim 20' of the housing-insert member 20, and, in the preferred embodiment, and pivotally connected thereto by means of pivot pins 26, 28, respectively, as also seen in FIG. 5. The first ends 22', 24' are preferably supported by the housing-insert member 20 at a rearwardly-positioned location, as seen in FIG. 2, so that, when the device 10 is set up for use, the drain-hole 16 is positioned forwardly of the first ends 22', 24', and between the two leg-members 22, 24, as seen in FIG. 1. However, it is within the scope and purview of the invention to support and secure the first ends 22', 24' to a forwardly-positioned portion of the rim 20', even though the drain-hole, in this instance, would lie rearwardly of the first ends 22', 24', the water will still enter into the drain-hole and be drained away. It is also within the scope and purview of the invention to provide perforations in the wall-surface of the housing-insert member 20, by which the liquid pushed thereat will be more readily drained way, in those applications where an upper portion of the frustoconically-shaped housing-insert member 20 is elevated above the plane of the floor. The insert-member 20 gives stability to the whole device, by retaining the leg-members in place, so that when water impinges against the leg-members, the leg-members remain firmly in place.

In the preferred embodiment, where the first ends 22', 24' are pivotally mounted to the housing-insert member 20 by means of the pivot pins 26, 28, the angular relationship between the deflecting leg-members is adjustable. This adjustment allows one to best position these leg-members so that the opening defined between the two second, cantilevered ends 22", 24" is optimal for the size and type of pushing implement being used to push the water toward and into the drain-hole, as well as to adapt the device to all floors and location of drain-hole. In the case where no pivot pins are used, the leg-members may still angularly-adjusted by simply repositioning them.

Each liquid-deflecting leg-member 22, 24 preferably consists of a main, upper, elongated support section 30, 32, which defines a downwardly-projecting, water-defecting section 30', 32', respectively. Preferably, each leg-member is one molded piece. The bottom edge-surface of each section 30", 32" contacts the floor-surface, in order to prevent water from passing under the device 10. As the bottom edge-surface contacts the floor-surface, the positioning of the housing-insert member 20 in the drain-hole will be adjusted up or down in accordance therewith, depending upon the size and shape of the drain-hole 16. While in the preferred embodiment, each leg-member is made of one molded piece, it is within the scope and purview of the invention to provide a downwardly-projecting, water-defecting section 30', 32' that is made of nonabsorbent, flexible material, such as rubber, synthetic rubber, and the like. This would obviate the need for any type of repositioning of the housing-insert member 20 in the drain-hole, since as the member 20 is inserted into the drain-hole, the flexible nature of the downwardly-projecting, water-defecting section 30', 32' would accommodate many different vertical positions of the member 20 in the drain-hole. Such a flexible material would also allow ready use of the device 10 in many differently-shaped and sized drain-holes, without having to worry about ensuring the bottom edge-surfaces of the downwardly-projecting, water-defecting section 30', 32' are in abutting contact against the floor-surface.

While a housing-insert member 20 has been shown and described, it is within the scope and purview to provide a device that need not use such an insert. The insert 20 ensures that the bottom edge-surfaces of the leg-members, 22, 24 are stable are remian in place, and are in abutting contact against the floor-surface 12, so that the water does not pass therebelow and passed the deflecting leg-members. Since the typical drain-hole 16 lies in a small depression, if the first ends 22', 24' were to lie directly on the depressed surface, the leg-members would be tilted until the second, cantilevered ends 22", 24" would be lifted above the floor-surface, and water would be able to pass under the bottom edge-surfaces. The insert 20 helps to support the first ends 22', 24' of the leg-members so that this does not occur. However, it is within the scope and purview of the invention to provide first ends 22', 24' with a height-adjusting screw or pin that will ensure that the bottom edge-surfaces of the leg-members contact the floor-surface 12.

Figure 7:
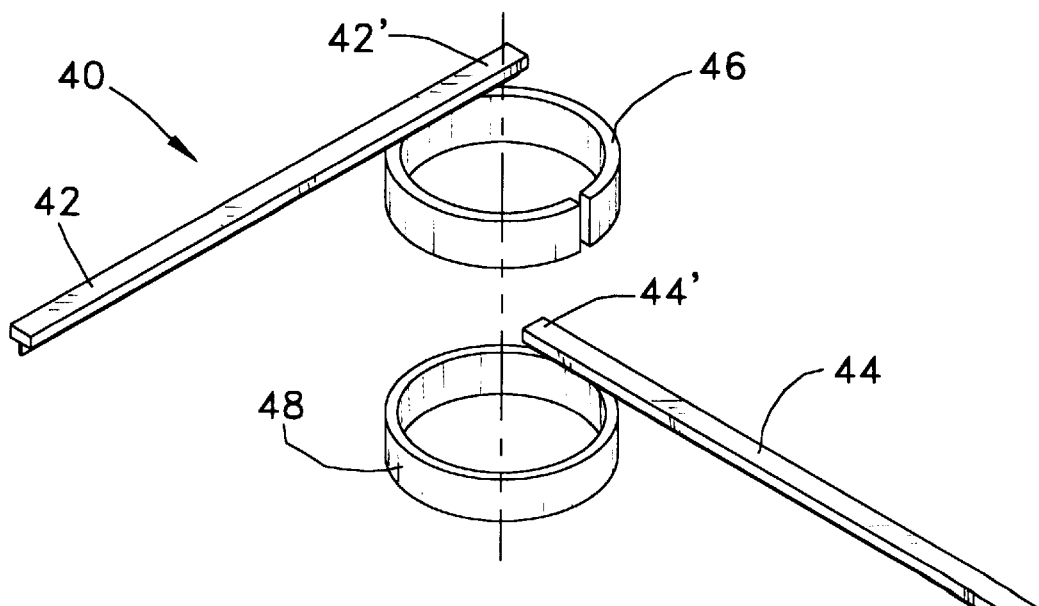
FIG. 7 is an isometric assembly view thereof.

Referring now to FIGS. 6 and 7, there is shown a second embodiment 40 of the invention. In this embodiment, each liquid-deflecting leg-member 42, 44 is operatively associated with its own cylindrically-shaped, or ring-shaped, insert-member 46, 48, respectively. The inner insert-member 46 is telescopingly received in the outer insert-member 48 when both are inserted into a drain-hole 16. Preferably, each end 42', 44', of the leg-members 42, 44, respectively are fastened or secured or otherwise attached to the respective insert-member 46, 48. Thus, after the insert-members 46, 48 have inserted into a drain-hole, the relative angular orientation of the leg-members 42, 44 may be adjusted by simply rotating the insert-members relative to each other. The insert-members support the ends above the drain-hole, such that the contact of the lower edge-surfaces of the leg-members contact the floor surface. This is necessary where the depression in which the drain-hole 16 is located would cause each leg-member to see-saw if the ends 42', 44' were allowed to rest directly on the depression where the drain hole is located. It is, of course, possible, in some applications, to allow the ends 42', 44', free movement, and not secure them to their respective insert-members.

Figure 8:
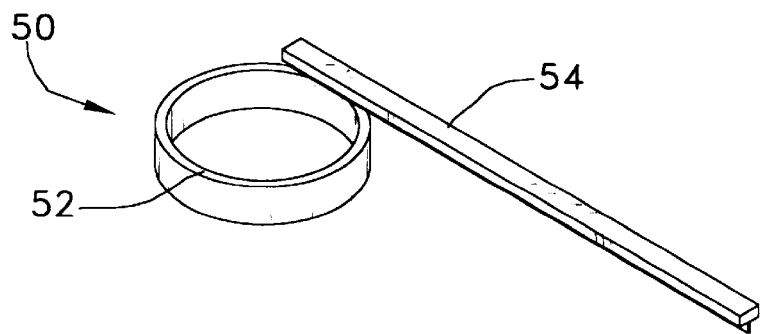
FIG. 8 is an isometric view of one liquid-deflecting leg-member attached to a insert-member for use in small areas that would not allow of a pair of such leg-members.

FIG. 8 shows a modification 50, where the device has one insert-member 52 and just one attached leg-member 54. This unit 50 has use in very small floor-areas.

Figure 9:
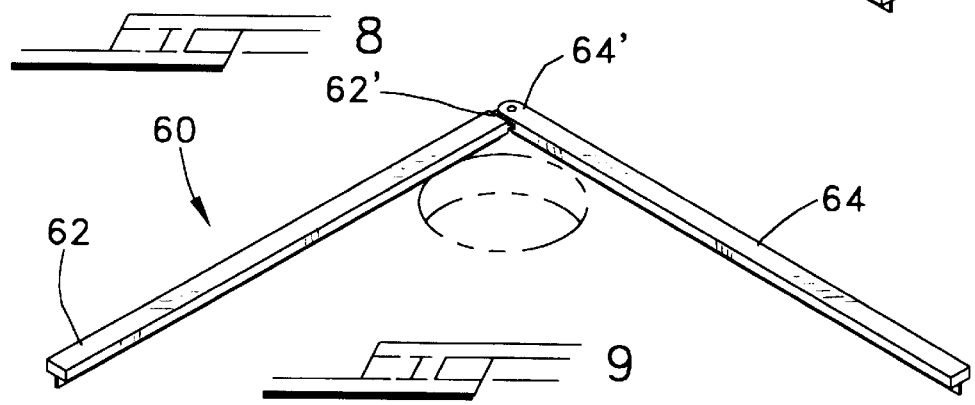
FIG. 9 is an isometric view of another embodiment of the invention, where the use of an insert-member is dispensed with, and where the ends of the two liquid-deflecting leg-members are hinged together for form one, whole unit.
Figure 10:
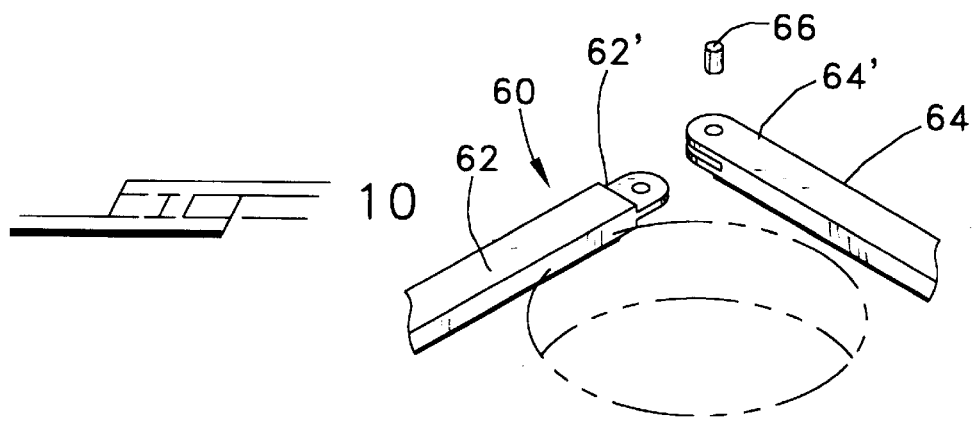
FIG. 10 is an isometric view of the embodiment of FIG. 9, showing the assembly of the two, hinged leg-members.

FIGS. 9 and 10 show another embodiment 60 where no insert-member is provided. Instead, the two leg-members 62, 64 are hinged together at respective inner ends 62', 64', via a hinge-pin 66, as can be seen on FIG. 10. In this embodiment, the leg-members are made of heavy material, such as plastic-coated or rubber-coated lead.

Figure 11:
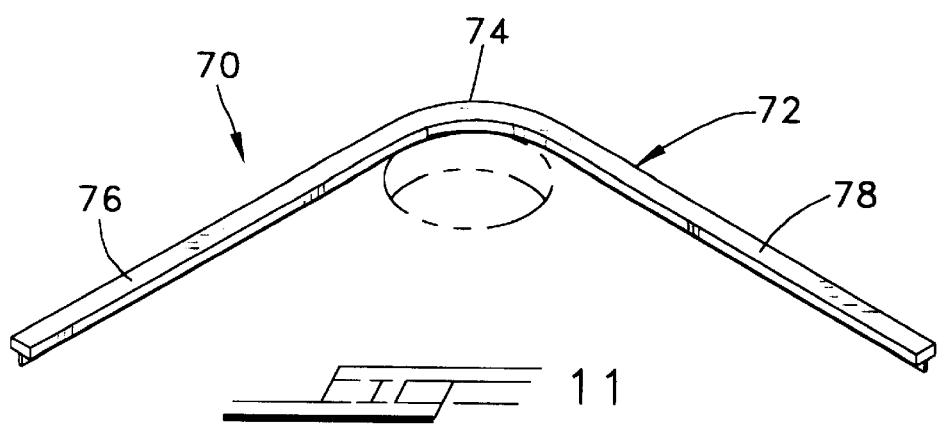
FIG. 11 is an isometric view of yet another embodiment of the invention, where the use of an insert-member is dispensed with, and instead of two separate leg-members, there is provided one, integral unit defining a U-shaped.

FIG. 11 shows yet another modification 70, that also does not use an insert-member, but is also made of heavy material to ensure it remains in place in close juxtaposition to the drain hole. In this embodiment, there is provided one, U-shaped, (or V-shaped) integrally-constructed deflecting member 72. The deflecting member defines an arcuate base-section 74 that is positioned next to a drain hole, as seen in FIG. 11, with a pair of leg-members 76, 78 extending from opposite ends of the central, arcuate base-section 74.

With a specific embodiment of the invention has been shown and described, it is to be understood that numerous changes and modifications may be made therein without departing from the scope and spirit of the invention as set forth in the appended claims.

What I claim is:

1. In a floor having a surface and a drain-hole formed therein by which liquid used for cleaning the floor surface may be drained therefrom, the improvement comprising:

deflecting means operatively associated with said drain-hole for directing a liquid moving toward said drain-hole into the said drain hole;

said deflecting means comprising a first and a second deflecting member each having a first portion and a second portion; said first and second deflecting members being operatively located with respect to said drain-hole and having a central longitudinal axis, said axes of said deflecting members forming an angle relative to each other; each said first portion being in close juxtaposition to said drain-hole, so that liquid pushed therealong by a pushing element enters directly into said drain-hole;

said second portions of said deflecting members being spaced from said first portions in cantilever fashion.

2. The improvement according to claim 1, wherein said deflecting means further comprises insert means for positioning in said drain hole, said first and second deflecting members being operatively associated with said insert means.

3. The improvement according to claim 2, wherein said insert means comprises pivotal mounting means for pivotally mounting said first ends of said first and second deflecting members, whereby said angle formed by said axes is adjustable.

4. The improvement according to claim 1, wherein each of said first and second deflecting members comprises a main elongated leg-section, and a downwardly projecting floor-contacting section against which liquid impinges for deflection therealong toward said drain-hole.

5. The improvement according to claim 4, wherein each said downwardly projecting floor-contacting section is made of non-absorbent material.

6. The improvement according to claim 4, wherein said deflecting means is one integral U-shaped or V-shaped element, whereby said deflecting members protrude outwardly away from said drain hole.

7. The improvement according to claim 1, wherein said insert means comprises at least one frustoconical-shaped housing for insertion into various-sized drain-holes.

8. The improvement according to claim 7, wherein each of said first and second deflecting members is at least partially made of non-absorbent, flexible material having a height that ensures abutting contact thereof against said floor-surface when said insert means is placed in differently-sized holes, whereby said deflecting members will still contact said floor-surface in order to divert water to said drain-hole.

9. The improvement according to claim 8, wherein each of said first and second deflecting members comprises a main, elongated leg-section, and a downwardly projecting floor-contacting section against which liquid impinges for deflection therealong toward said drain-hole; each of said first and second deflecting members also comprising a downwardly-projecting, floor-contacting section against which liquid impinges for deflection therealong toward said drain-hole;

each said downwardly-projecting, floor-contacting section being made of non-absorbent, flexible material having a height that ensures abutting contact thereof against said floor-surface when said insert-member is placed in differently-sized holes, whereby said deflecting members will still contact said floor-surface in order to divert liquid to said drain-hole.

10. In a method of cleaning a floor in which floor there is provided a drain-hole by which cleaning liquid may be drained away after having washed the floor, said cleaning liquid being pushed toward said drain-hole by means of a push-member, such as a squeegee, sponge-head mop, and the like, the improvement comprising:

(a) positioning a liquid-deflecting device in operational juxtaposition with said drain-hole, which liquid-deflecting device comprises a first and a second liquid-deflecting leg-member, said leg-members forming an angle and a receiving space therebetween;

(b) pushing the liquid along said floor toward said receiving space between said leg-members;

(c) said step (b) inherently causing the deflection of the cleaning liquid along said receiving space via said leg-members and into said drain hole.

11. The method of cleaning a floor according to claim 10, further comprising:

(d) adjusting the relative orientation of said leg-members in order to adjust said angle therebetween, in order to provide an angle and receiving space, optimal to the floor being cleaned and the pushing member being used.

12. The method of cleaning a floor according to claim 10, further comprising:

(d) removing said liquid-deflecting device from association with said drain-hole, and storing it in a remote location for subsequent use.

13. The method of cleaning a floor according to claim 12, wherein said liquid-deflecting device comprises a housing-insert means; said method further comprising:

(e) said step (a) comprising inserting said housing-insert means into said drain-hole, and supporting the first ends of the deflecting leg-members thereon.

14. The method of cleaning a floor according to claim 10, wherein each said leg-member is at least made partially of a flexible material; said step (a) comprising causing at least a portion of the bottom edge-surface of each said leg-member abutting contact thereof against said floor, whereby regardless of the depth and size of a said drain-hole, said bottom-edge-surfaces of said leg-members contact said floor.

15. The method according to claim 10, wherein said step (a) comprises locating said drain-hole in close juxtaposition to the vertex of said angle formed by said leg-members and in said receiving space.

16. A device for use in a drain-hole of a floor having a surface to be cleaned by placing liquid on the surface and pushing the liquid along said surface toward said drain-hole by means of a squeegee, mop, and the like, by which the liquid may be drained, comprising:

deflecting means operatively associated and juxtapositioned with respect to said drain-hole for directing the liquid toward and into the said drain hole as the liquid is pushed therealong; said deflecting means comprising a first and second deflecting member;

said deflecting means further comprising an insert-means for insertion into said drain-hole, said first and second deflecting members each having a first end and a second end; said first ends of said deflecting members being connected to said insert means; each of said first and second deflecting members extending outwardly from said insert means and having a central longitudinal axis, said axes of said deflecting members forming an angle relative to each other; said second ends of said deflecting members being spaced from said first ends in cantilever fashion.

17. The device according to claim 16, wherein said insert means comprises pivotal mounting means for pivotally mounting said first ends of said first and second deflecting members, whereby said angle formed by said axes is adjustable.

18. The device according to claim 16, wherein said deflecting means is an approximate U-shaped or V-shaped member.

19. The device according to claim 16, wherein said deflecting means comprises a pair of elongated deflecting members each having a first and a second end, said first ends being pivotally connected to each other for varying the angle therebetween.

20. In a floor having a surface and a drain-hole formed therein by which liquid used for cleaning the floor surface may be drained therefrom, the improvement comprising:

deflecting means operatively associated with said drain-hole for directing a liquid moving toward said drain-hole into the said drain hole;

said deflecting means comprising a first and a second deflecting member; said first and second deflecting members being operatively located with respect to said drain-hole and having a central axis, said axes of said deflecting members forming an angle relative to each other; a portion of each said deflecting member being in close juxtaposition to said drain-hole, so that liquid pushed therealong by a pushing element enters directly into said drain-hole;

said insert means comprising at least one frustoconical-shaped housing for insertion into various-sized drain-holes.

21. In a floor having a surface and a drain-hole formed therein by which liquid used for cleaning the floor surface may be drained therefrom, the improvement comprising:

deflecting means operatively associated with said drain-hole for directing a liquid moving toward said drain-hole into the said drain hole;

said deflecting means comprising a first and a second deflecting member each having a first end and a second end; said first and second deflecting members being operatively located with respect to said drain-hole and having a central longitudinal axis, said axes of said deflecting members forming an angle relative to each other; each said first end being in close juxtaposition to said drain-hole, so that liquid pushed therealong by a pushing element enters directly into said drain-hole;

said deflecting means comprising a pivot means; said first ends of said first and second deflecting members being hinged together by said pivot means.

22. A device for use in a drain-hole of a floor having a surface to be cleaned by placing liquid on the surface and pushing the liquid along said surface toward said drain-hole by means of a squeegee, mop, and the like, by which the liquid may be drained, comprising:

deflecting means operatively associated and juxtapositioned with respect to said drain-hole for directing the liquid toward and into the said drain hole as the liquid is pushed therealong; said deflecting means comprising a first and second deflecting member;

said deflecting means comprising a pair of elongated deflecting members each having a first and a second end, said first ends being pivotally connected to each other for varying the angle therebetween.

\* \* \* \* \*